United States Patent
Andrew (10) Patent No.: US 7,624,019 B2
(45) Date of Patent: Nov. 24, 2009

(54) RAISING THE VISIBILITY OF A VOICE-ACTIVATED USER INTERFACE

(75) Inventor: Felix Andrew, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 780 days.

(21) Appl. No.: 11/251,736

(22) Filed: Oct. 17, 2005

(65) Prior Publication Data

US 2007/0088557 A1     Apr. 19, 2007

(51) Int. Cl.
*G10L 21/00* (2006.01)
*G10L 21/06* (2006.01)

(52) U.S. Cl. .................. 704/275; 704/276; 715/700; 345/956

(58) Field of Classification Search ............. 704/275, 704/276; 345/956; 715/700
See application file for complete search history.

(56) References Cited

U.S. PATENT DOCUMENTS

| | | | |
|---|---|---|---|
| 6,233,560 B1 * | 5/2001 | Tannenbaum | 704/275 |
| 6,882,974 B2 * | 4/2005 | James et al. | 704/270.1 |
| 2002/0054136 A1 * | 5/2002 | Andrew et al. | 345/800 |
| 2002/0059073 A1 * | 5/2002 | Zondervan et al. | 704/270.1 |
| 2006/0119615 A1 * | 6/2006 | Zhou et al. | 345/619 |
| 2007/0273637 A1 * | 11/2007 | Zhou et al. | 345/107 |

* cited by examiner

*Primary Examiner*—David R Hudspeth
*Assistant Examiner*—Abdelali Serrou
(74) *Attorney, Agent, or Firm*—Westman, Champlin & Kelly, P.A.

(57) ABSTRACT

A system is configured to enable a user to assert voice-activated commands. When the user issues a non-ambiguous command, the system activates a corresponding control. The area of activity on the user interface is visually highlighted to emphasize to the user that what they spoke caused an action. In one specific embodiment, the highlighting involves floating text the user uttered to a visible user interface component.

14 Claims, 13 Drawing Sheets

RAISING THE VISIBILITY OF A VOICE-ACTIVATED USER INTERFACE

BACKGROUND

Some computer systems are configured to support voice-activated command and control. For example, some systems are configured such that when a user speaks a non-ambiguous command, the system recognizes the command and supports activation of a corresponding control. In this manner, a user can use voice commands to navigate through the system environment, for example, through various user interface components associated with a software application.

In some cases, it will not be very apparent to the user that what they just spoke actually effectuated control within the framework of the system or application. For example, it may not be apparent to the user that any action was taken at all. Similarly, it may not be apparent that an application state has changed.

In some instances, a user can become lost or confused if a command is spoken with an expectation that a particular control will be effectuated but the system is configured to activate a different control. For example, a user might say "open file" with an expectation that a folder appearing on a desktop will be opened. Contrary to the user's expectation, however, the system may be configured to open a drop-down menu under a "FILE" designator that appears on the same desktop. The nature of this inconsistency of expectations may not be immediately apparent to the user.

The discussion above is merely provided for general background information and is not intended for use as an aid in determining the scope of the claimed subject matter.

SUMMARY

A system is configured to enable a user to assert voice-activated commands. When the user issues a non-ambiguous command, the system activates a corresponding control. The area of activity on the user interface is visually highlighted to emphasize to the user that what they spoke caused an action. In one specific embodiment, the highlighting involves floating text the user uttered to a visible user interface component.

This Summary is provided to introduce a selection of concepts in a simplified form that are further described below in the Detailed Description. This Summary is not intended to identify key features or essential features of the claimed subject matter, nor is it intended for use as an aid in determining the scope of the claimed subject matter.

DETAILED DESCRIPTION

Figure 1:
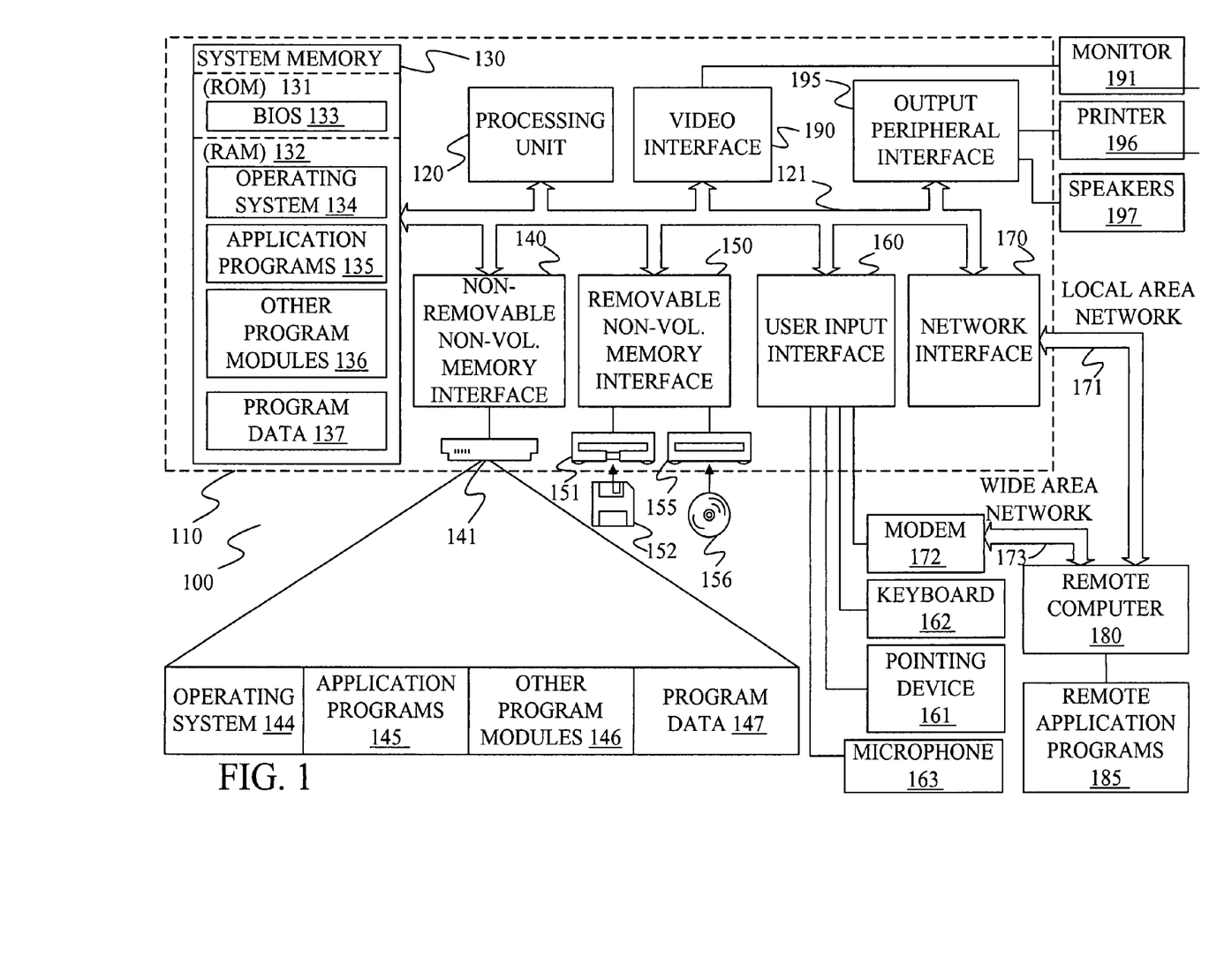
FIG. 1 is a block diagram of one computing environment in which some embodiments may be practiced.

FIG. 1 illustrates an example of a suitable computing system environment 100 on which embodiments may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

Embodiments are operational with numerous other general purpose or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Some embodiments are designed to be practiced in distributed computing environments where tasks are performed by remote processing devices that are linked through a communications network. In a distributed computing environment, program modules are located in both local and remote computer storage media including memory storage devices.

With reference to FIG. 1, an exemplary system for implementing some embodiments includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during startup, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

A computer system is illustratively configured to enable a user to assert voice-activated commands. When the user issues a non-ambiguous command, the system activates a corresponding control. The area of activity on the user interface is visually highlighted to emphasize to the user that what they spoke caused an action.

FIGS. 2A-2E are a progressive series of diagrammatic illustrations demonstrating one option for accomplishing visual highlighting of a voice-activated command in the context of a music player software application. The series of Figures depicts a computer system 200 that includes a monitor 202, a microphone 204, a mouse 208 and a keyboard 206. The display area within monitor 202 shows an application user interface 214, a music player user interface 212 and a speech support application user interface 210.

Interface 210 is illustratively associated with an application that supports voice-activated command and control. Interface 212 is illustratively associated with an application that supports an ability to play music from a compact disc. Interface 214 is illustratively associated with any of a variety of applications that include, as illustrated, a file menu, an edit menu and a view menu.

Figure 2A:
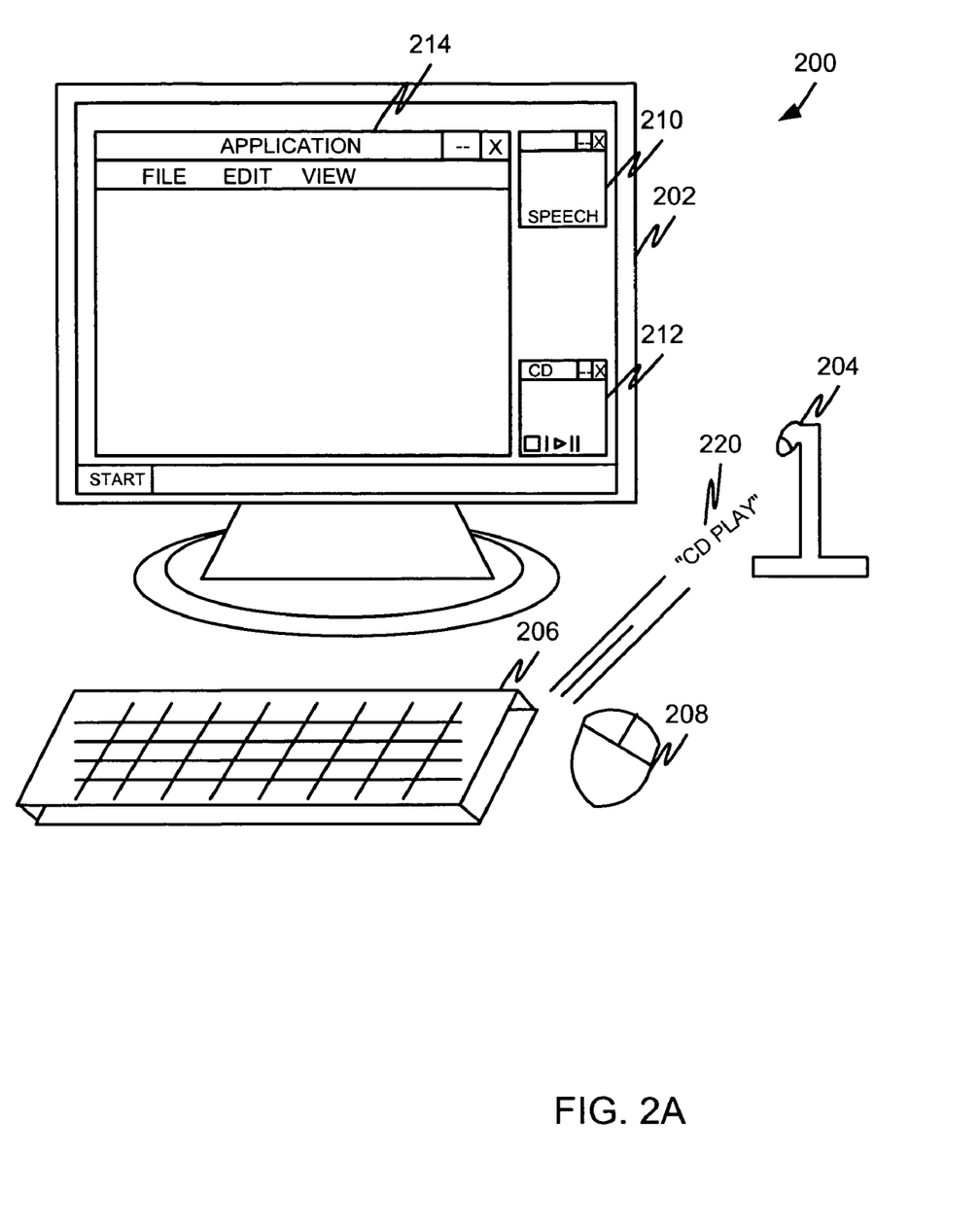
FIGS. 2A-2E are a series of diagrammatic illustrations demonstrating a visual representation of a voice-activated command in the context of a music player.

A user illustratively says the words "CD PLAY" into microphone 204. In FIG. 2A, this action is shown as speech input 220. Speech input 220 is digitized and translated by a speech recognition engine into a user command that represents a request by the user to cause application 212 to play a currently loaded CD.

Figure 2B:
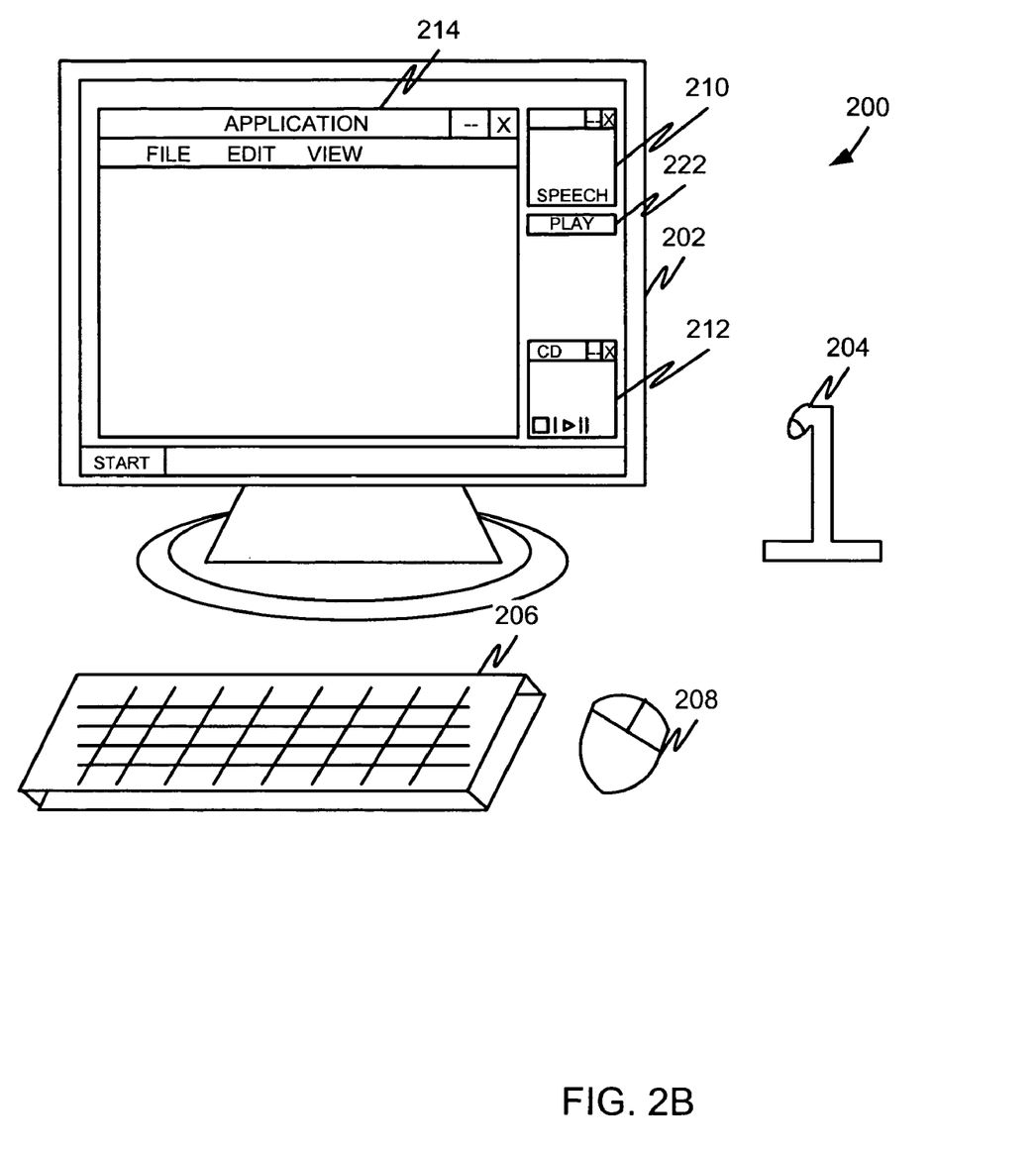

A visual representation of the user's spoken command is generated. This is shown in FIG. 2B as user interface component 222. Illustratively, component 222 first appears from within, or proximate to, application interface 210. Alternatively, component 222 can originate from elsewhere (e.g., from the illustrated START menu icon, from a corner, from a relatively uncluttered portion of the display, etc.). Further, component 222 need not necessarily be implemented as the illustrated block containing a word-based representation of the spoken command. The visible implementation can be words without the illustrated block boundary. Alternatively, component 222 can incorporate a symbol instead of a word or words. Those skilled in the art will appreciate that there are many obvious alternatives that should be considered within the scope of the present invention.

Figure 2C:
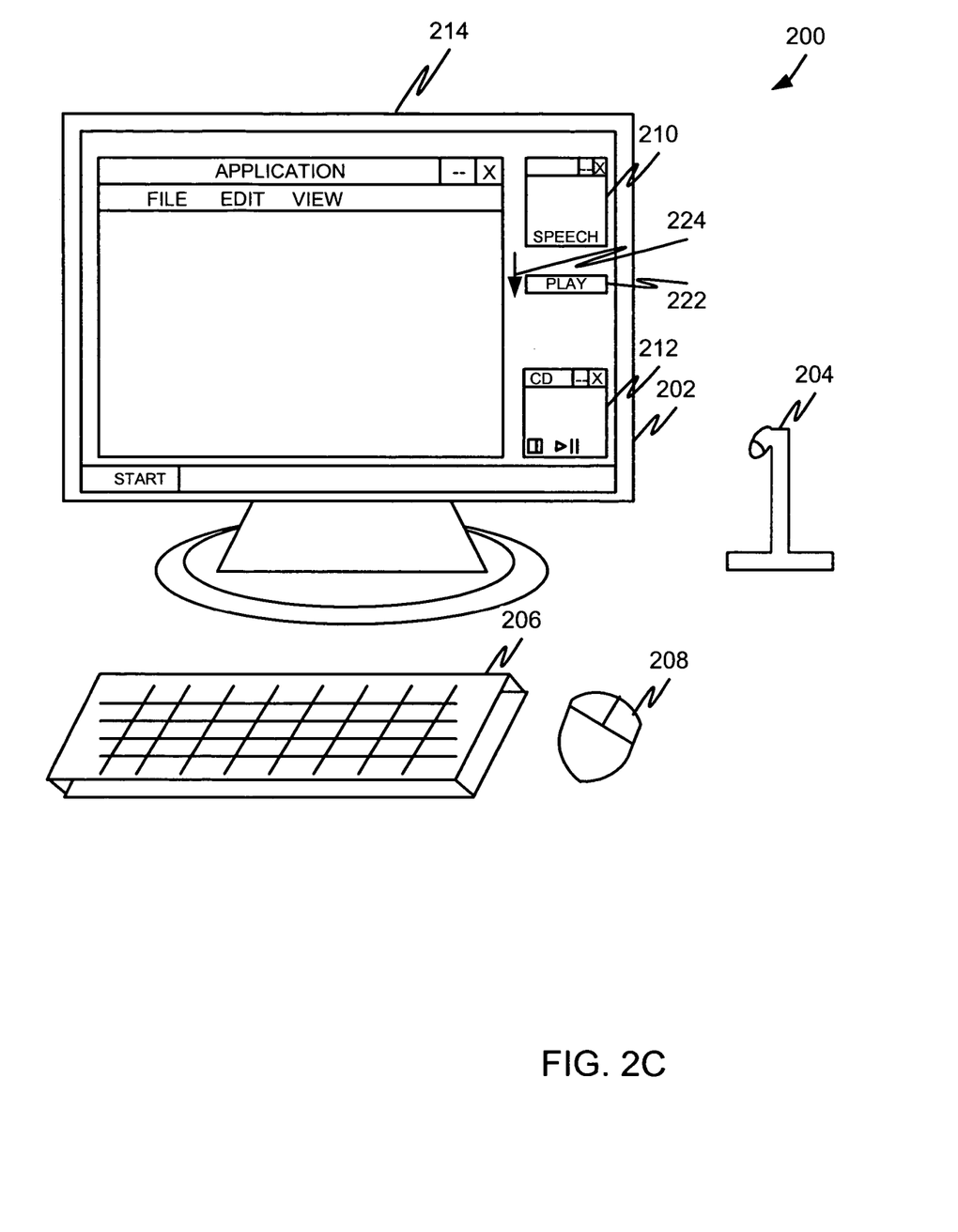
Figure 2D:
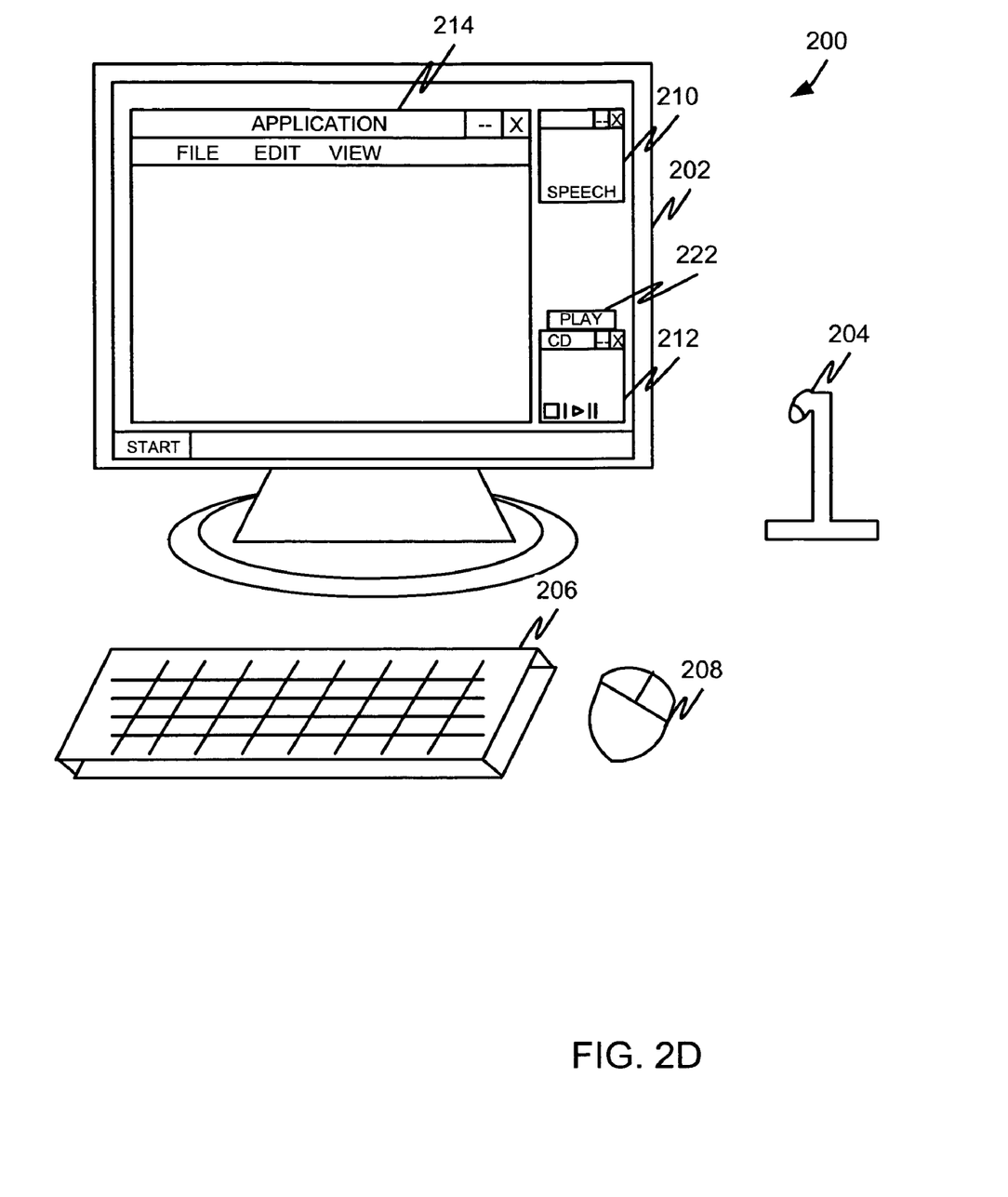
Figure 2E:
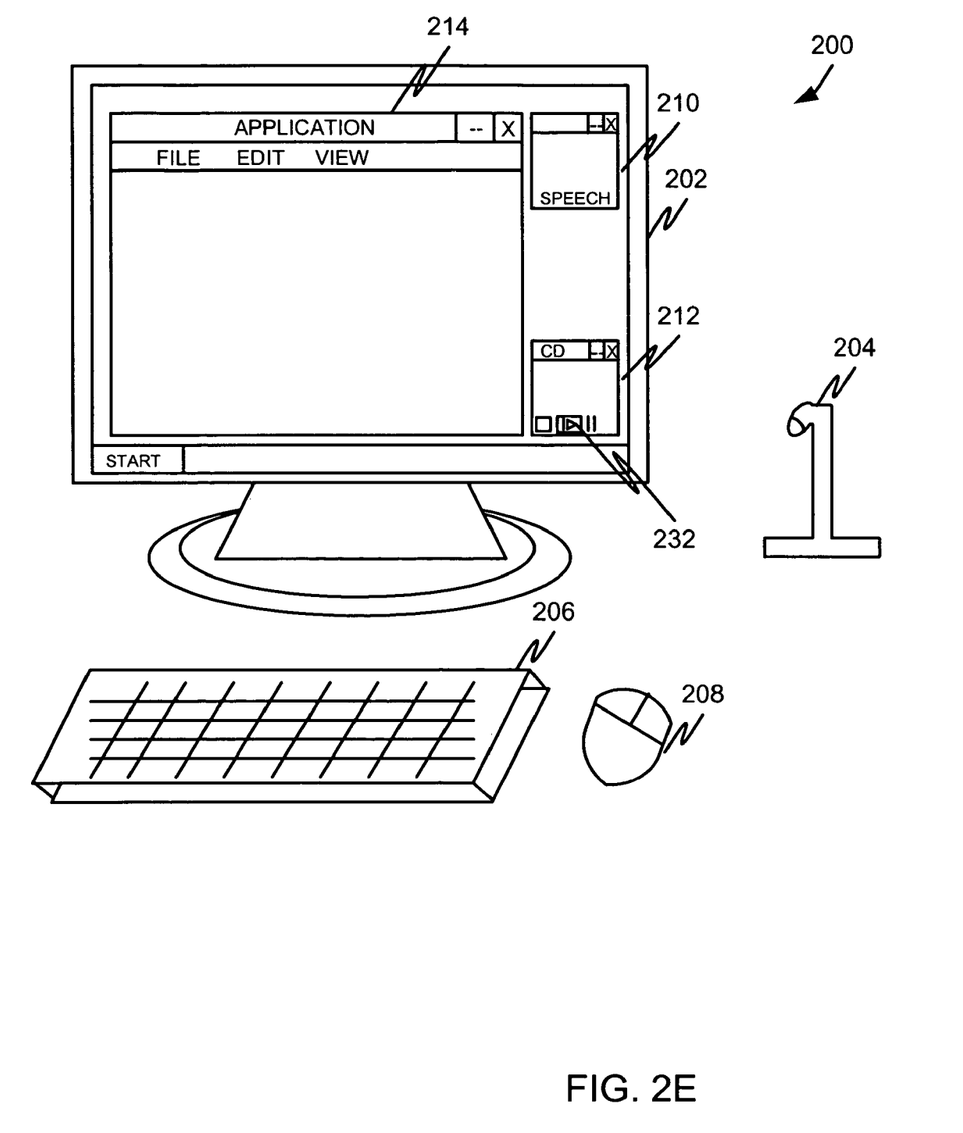

As is indicated in FIG. 2C by arrow 224, the user interface component 222 moves away from application interface 210 and toward application interface 212. As is indicated in FIG. 2D, user interface component 222 continues to move until it approaches or contacts application interface 212. As is indicated in FIG. 2E, component 222 has now disappeared and has been replaced by a visual emphasis 232 of the play button.

In one embodiment, user interface component does not stop at the border of application interface 212 but instead goes all the way to the play button itself.

It should be noted that it is within the scope of the present invention for there to be visible continuity from the time that component 222 first appears to the time that the component disappears. In other words, the series of FIGS. 2A-2E do not capture the fact that user interface component 222 may not obviously appear and re-appear during the transition from initial appearance to final disappearance.

It should be emphasized that there are many variations that should be considered within the scope of the present invention. For example, user interface component 222 can be configured to pause at its final destination before disappearing. In another example, inter interface component 222 can change sizes during its period of existence (e.g., start small and grow larger as destination is approached). In another example, the path from source to destination may not necessarily be direct (e.g., component 222 could corkscrew in until the destination is reached). These are just example of many potential similar variations.

FIGS. 3A-3F are a progressive series of diagrammatic illustrations demonstrating another option for accomplishing visual highlighting of a voice-activated command in the context of a file menu function that is operational from within an application user interface. The series of Figures depicts a computer system 300 that includes a monitor 302, a microphone 304, a mouse 308 and a keyboard 306. The display area within monitor 302 shows an application user interface 314, a music player user interface 312 and a speech support application user interface 310.

Interface 310 is illustratively associated with an application that supports voice-activated command and control. Interface 312 is illustratively associated with an application that supports an ability to play music from a compact disc. Interface 314 is illustratively associated with any of a variety of applications that include, as illustrated, a file menu, an edit menu and a view menu.

Figure 3A:
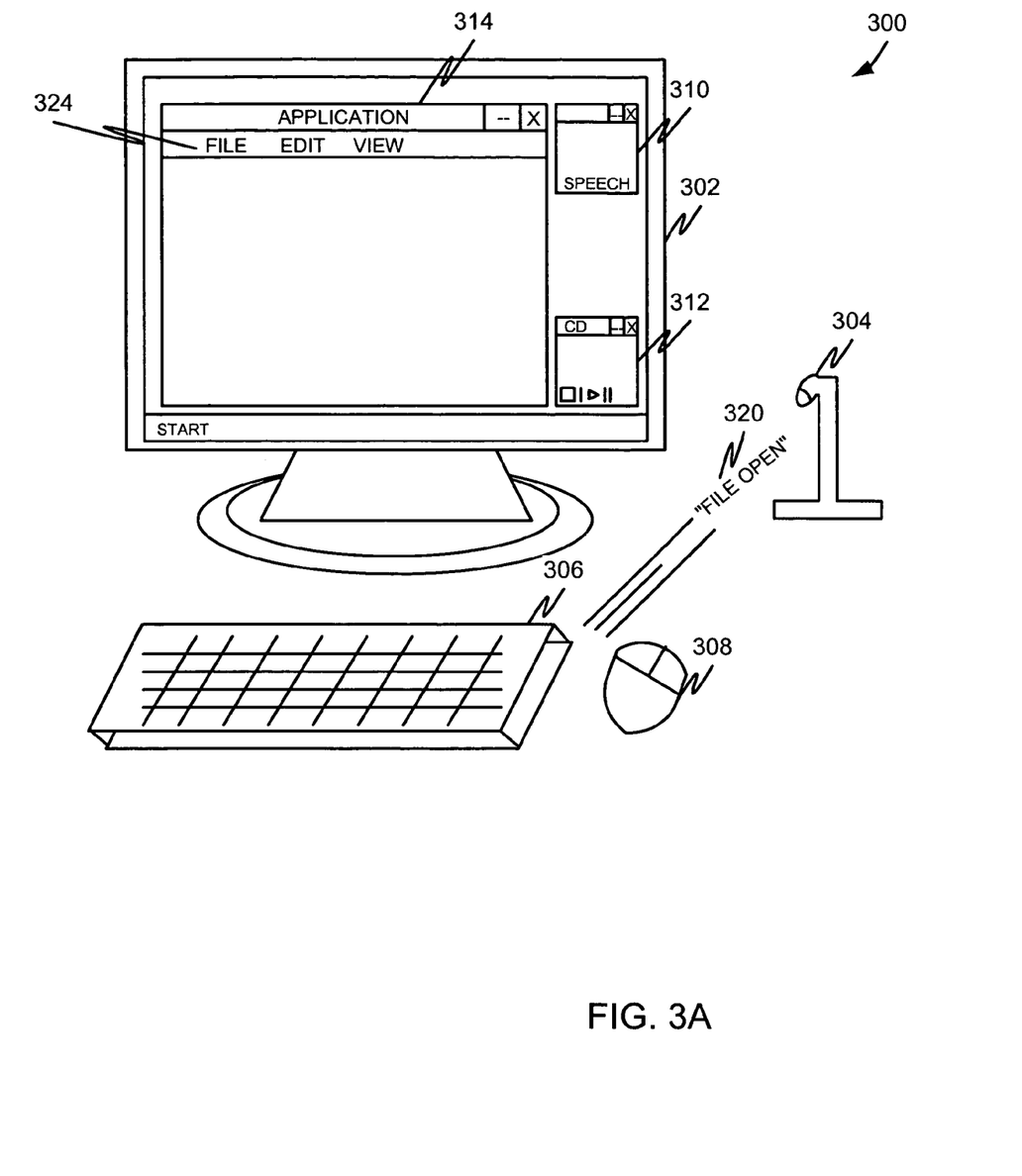
FIGS. 3A-3F are a series of diagrammatic illustrations demonstrating a visual representation of a voice-activated command in the context of a file menu.

A user illustratively says the words "FILE OPEN" into microphone 304. In FIG. 3A, this action is shown as speech input 320. Speech input 320 is digitized and translated by a speech recognition engine into a user command that represents a request by the user to access display options associated with a file menu icon 324 associated with application interface 314.

Figure 3B:
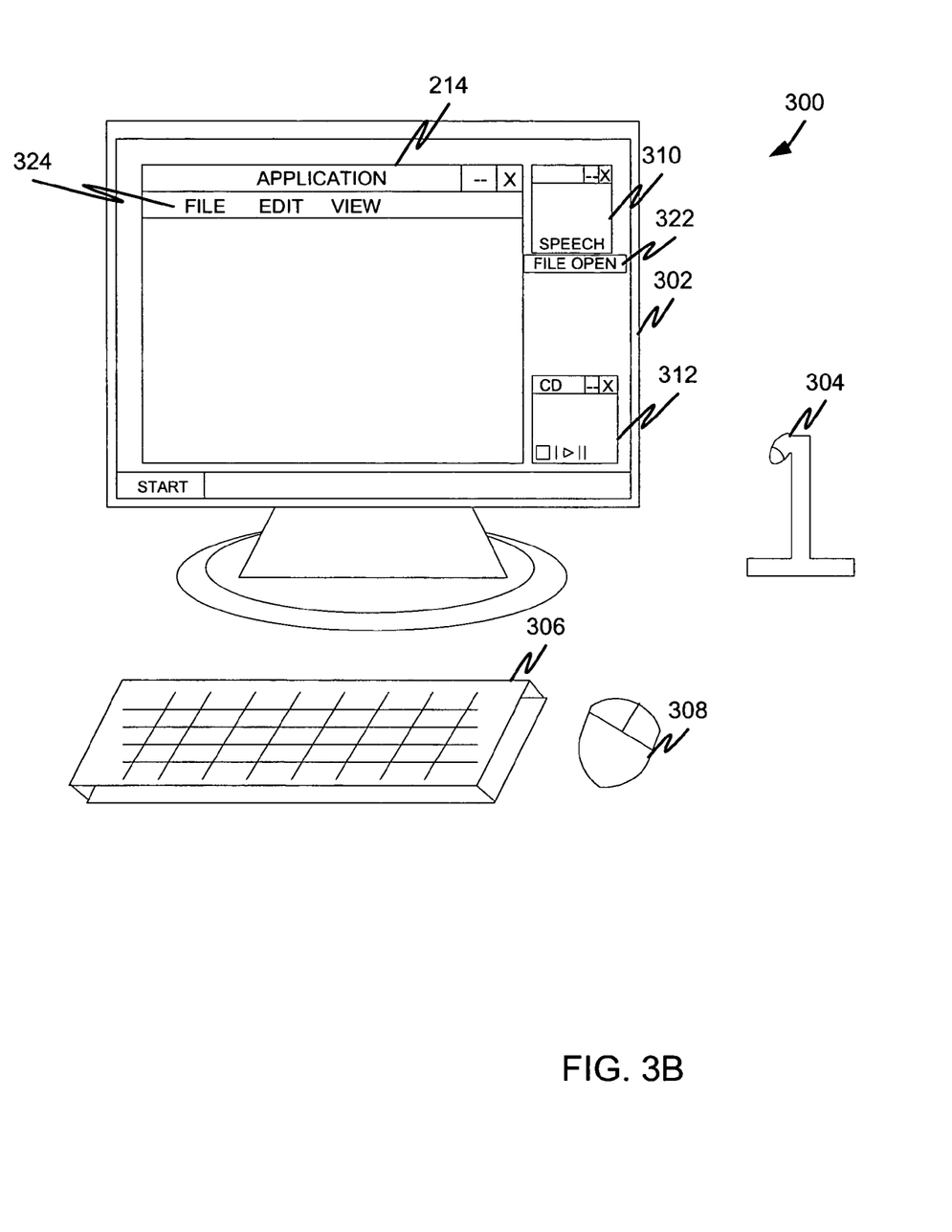

A visual representation of the user's spoken command is generated. This is shown in FIG. 3B as user interface component 322. Illustratively, component 322 first appears from within, or proximate to, application interface 310. Alternatively, component 322 can originate from elsewhere (e.g., from the illustrated START menu icon, from a corner, from a relatively uncluttered portion of the display, etc.). Further, component 322 need not necessarily be implemented as the illustrated block containing a word-based representation of the spoken command. The visible implementation can be words without the illustrated block boundary. Alternatively, component 322 can incorporate a symbol instead of a word or words. Those skilled in the art will appreciate that there are many obvious alternatives that should be considered within the scope of the present invention.

Figure 3C:
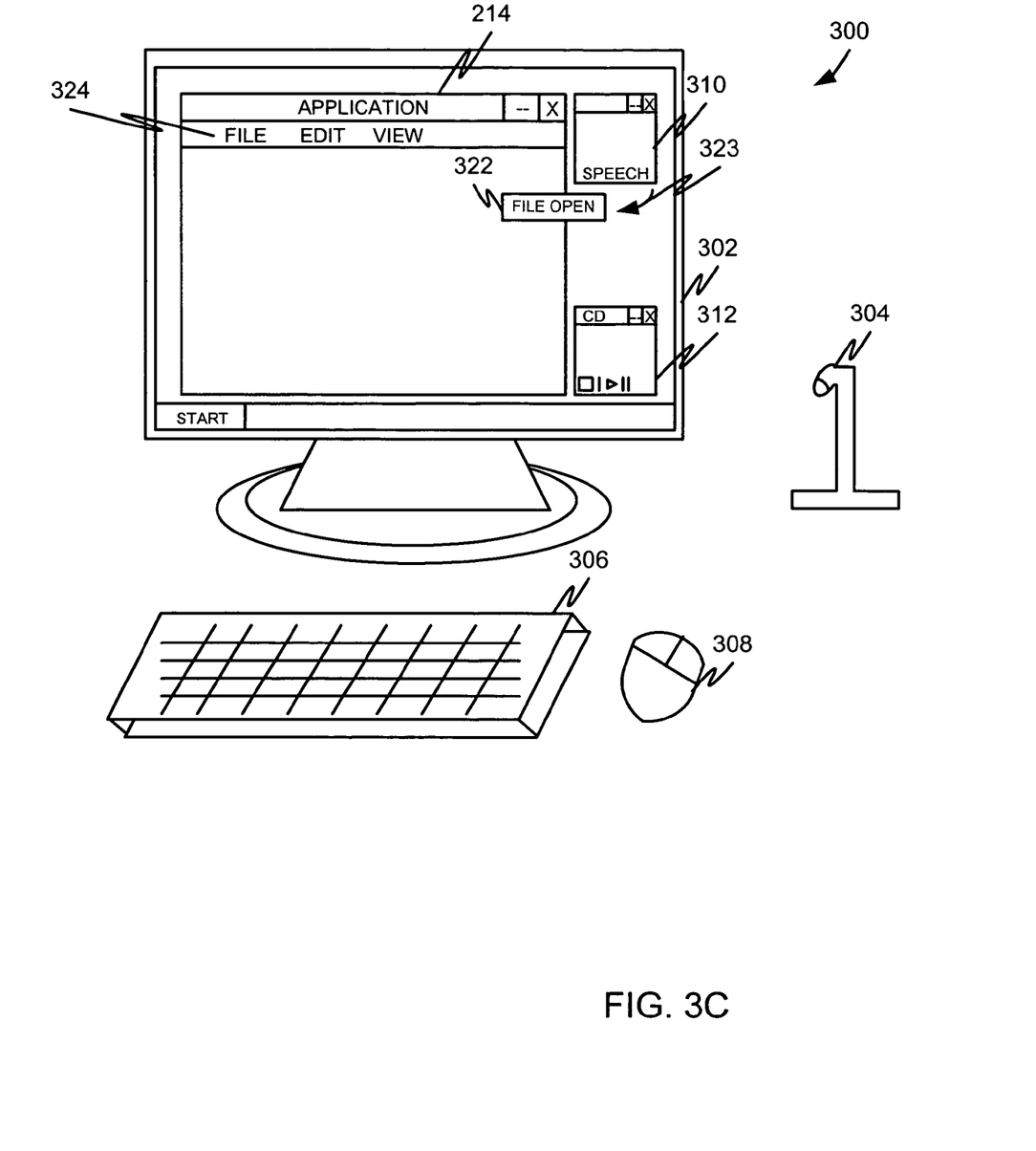
Figure 3D:
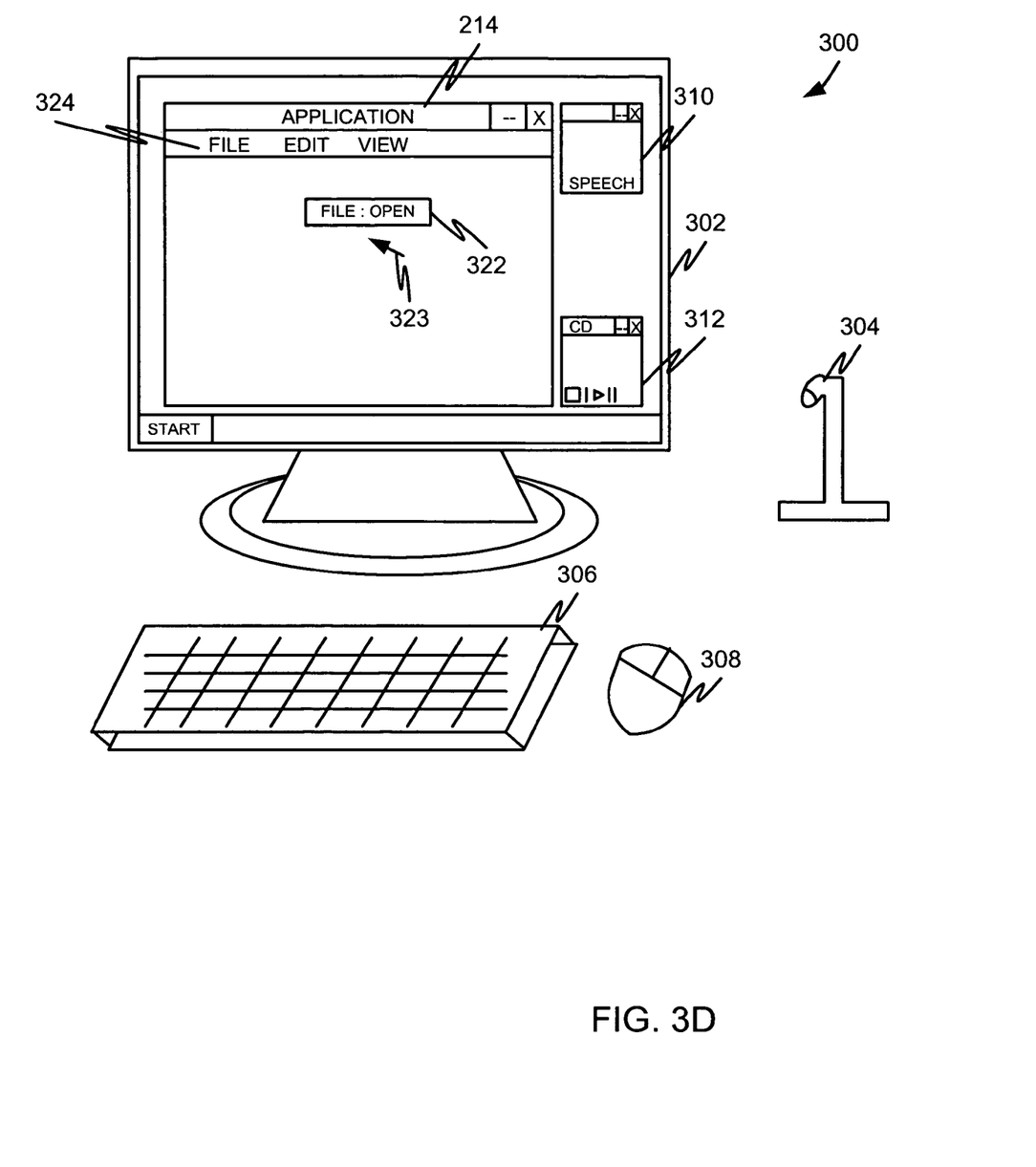
Figure 3E:
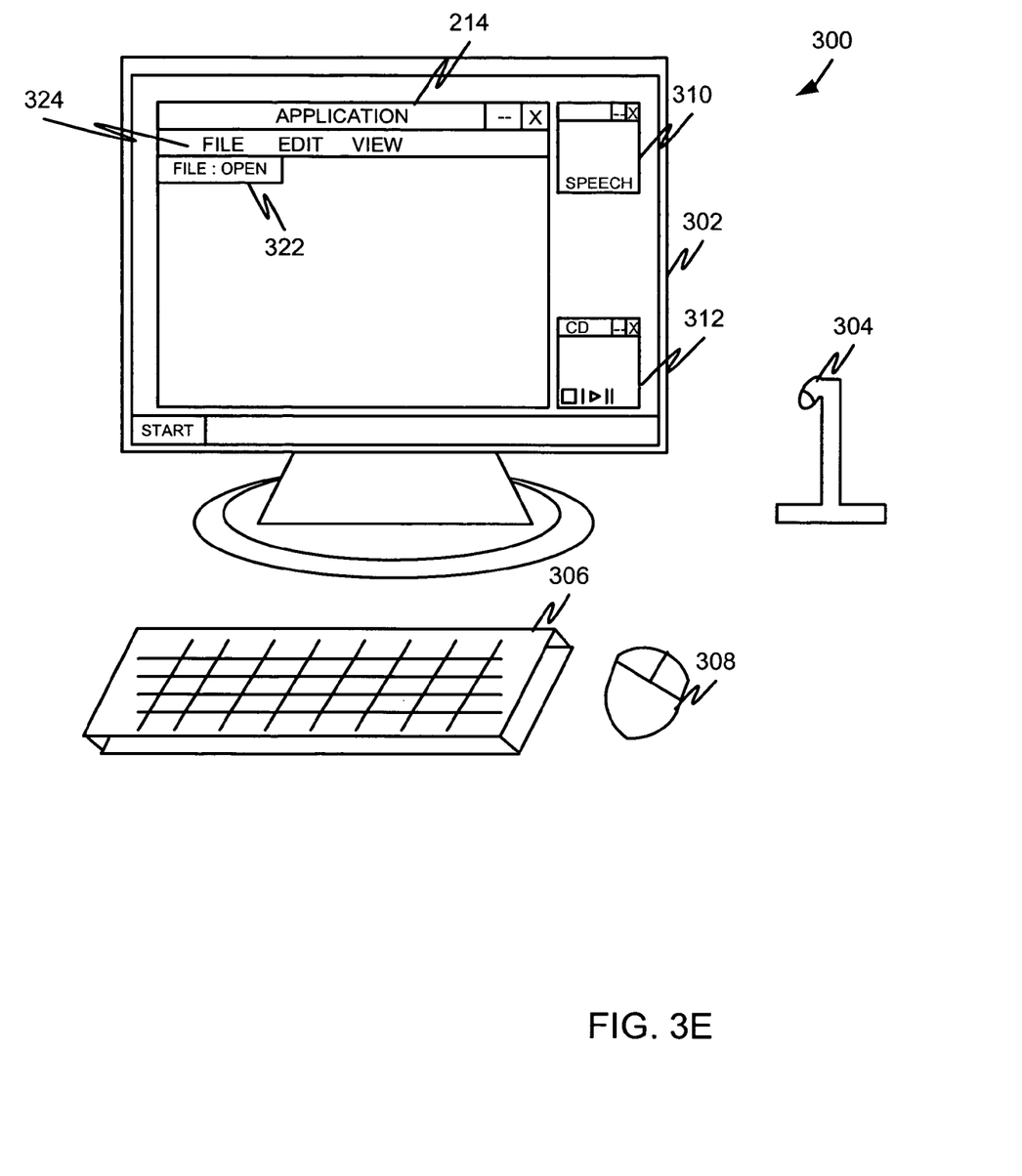
Figure 3F:
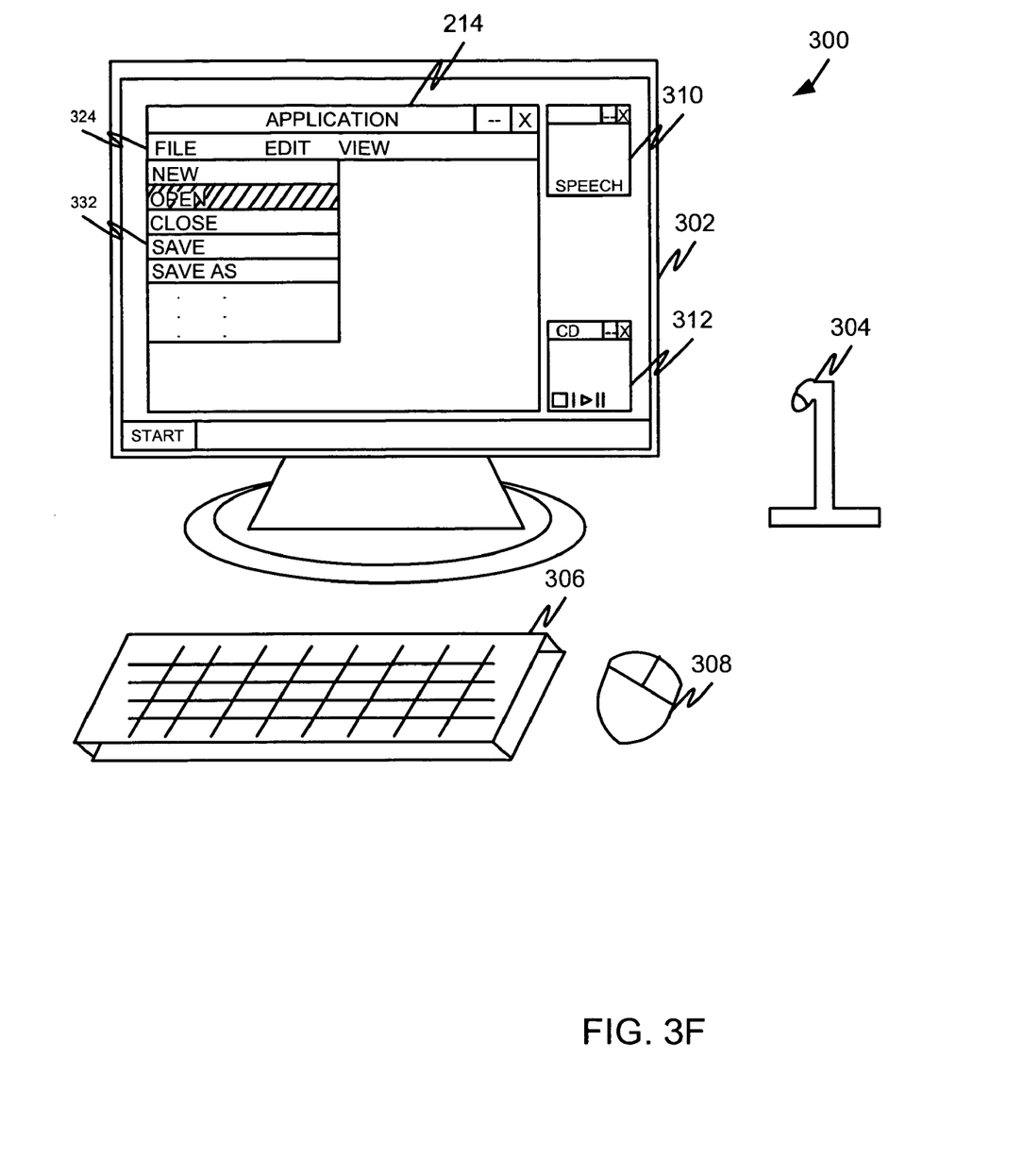

As is indicated in FIGS. 3C and 3D by arrow 323, the user interface component 322 moves away from application interface 310 and toward file menu indicator 324. As is suggested by FIG. 3E, user interface component 322 continues to move until it approaches or contacts file menu indicator 324. As is indicated in FIG. 3F, component 322 has now disappeared and has been replaced by file menu 332. In one embodiment, user interface component 322 does not go all the way to the file menu indicator itself but instead stops at the border of application interface 314.

It should be noted that it is within the scope of the present invention for there to be visible continuity from the time that component 322 first appears to the time that the component disappears. In other words, the series of FIGS. 3A-3F do not capture the fact that user interface component 322 may not obviously appear and re-appear during the transition from initial appearance to final disappearance. It should again be emphasized that there are many variations that should be considered within the scope of the present invention. Several example variations were described above in the context of the FIG. 2 example.

Figure 4:
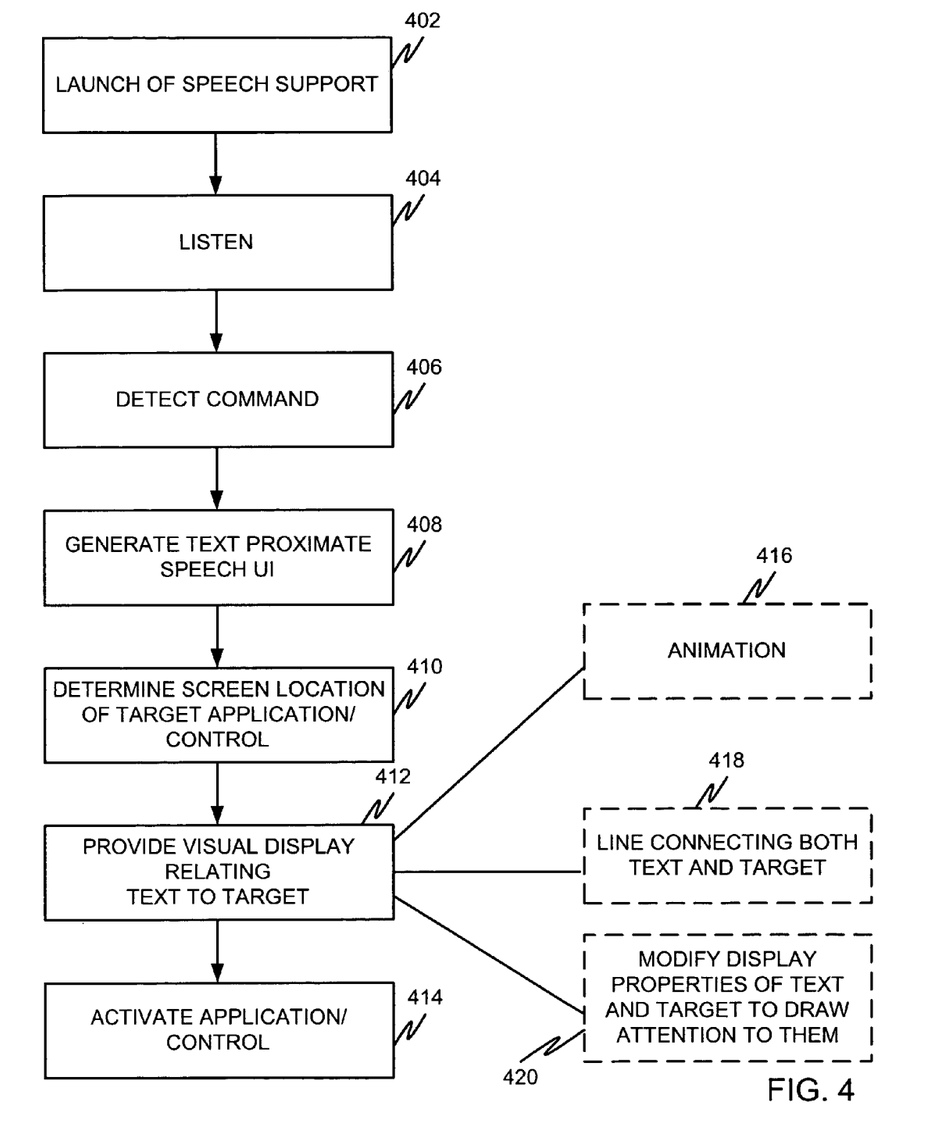
FIG. 4 is a block flow diagram illustrating steps associated with raising the visibility of a voice-activated user interface.

FIG. 4 is a block flow diagram illustrating a broad set of example steps associated with raising the visibility of a voice-activated user interface. In accordance with block 402, support for voice-activated command and control is launched. In accordance with block 404, the system is configured to monitor for voice input from a user. In accordance with block 406, when voice input is received, it is processed to determine when a voice-activated command has been received. In accordance with bock 408, a visible indication of text associated with a received command is generated and displayed proximate a user interface component associated with a speech application. As was mentioned in reference to other Figures, the visible indication could just as easily originate from elsewhere on the display (there may not even be a user interface component associated with a speech application).

In accordance with block 410, a determination is made as to where on the display there is a user interface component associated action to be conducted in association with the received voice-activated command. In accordance with block 412, a visual display is provided in order to visibly associate the generated command text with the target user interface component. Finally, in accordance with block 414, the action or function associated with the target user interface component is activated or executed.

It should be noted that the scope of the present invention extends to a range of methods for visibly associating a visible representation of a spoken command with a visible representation of action to be taken in association with the command. As is indicated in FIG. 4 by block 416, any kind of animation can be utilized to make the connection. The floating text examples providing herein are just examples of appropriate animations. As is indicated by block 418, a visible line connecting the command text to an appropriate representation of action can be utilized to make the association. As is indicated by block 420, another alternative is to modify display properties of the command text and/or representation of action to draw user's attention. For example, the text and/or representation of action might become expanded in size, underlined, glow, etc. Those skilled in the art will appreciate that all similar variations should also be considered within the scope of the present invention.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for raising the visibility of a voice-activated user interface, the method comprising:

receiving a voice-activated command; utilizing a computer processor that is a functional component of the computer to generate a visual representation of the received voice-activated command;

displaying the visual representation of the received voice-activated command on a display that is another functional component of the computer;

utilizing the computer processor to generate a visual representation of an action to be taken in response to the received voice-activated command;

displaying, on the display simultaneously with the visual representation of the received voice-activated command, said visual representation of an action to be taken in response to the received voice-activated command;

providing, on the display, a visual display that visually relates the visual representation of the received voice-activated command to said visual representation of the action to be taken in response to the received voice-activated command; and wherein providing the visual display comprises providing, on the display, a visual animation of a display item that moves across the display to a location that is overlapping with, or visually adjacent to, said visual representation of the action to be taken in response to the received voice-activated command.

2. The method of claim 1, wherein providing a visual animation comprises rendering and re-rendering a collection of text such that the collection of text appears on the display to be moving across the display until it reaches said location.

3. The method of claim 2, wherein displaying the visual representation of the received voice-activated command on the display comprises manipulating the visual representation of the received voice-activated command such that the visual representation of the received voice-activated command appears to originate from a speech application component, and wherein the speech application component is rendered on the display in conjunction with an identifier that visually identifies the speech application component as being connected to speech-recognition functionality.

4. The method of claim 3, wherein manipulating the visual representation further comprises manipulating such that said visual representation of the received voice-activated command appears to originate from a standard location on the display from which other visual representations of other received voice-activated commands also appear to originate, and wherein the standard location is, on the display, separated by distance from any visual representation of a control connected to functionality for executing the received voice-activated command.

5. The method of claim 1, wherein providing a visual animation comprises rendering and re-rendering a collection of text such that the collection of text appears on the display to be moving across the display along an indirect route until it reaches said location.

6. The method of claim 1, further comprising modifying display properties of one or the other of, or both of, said visual representation of the received voice-activated command and the visual representation of action to be taken.

7. The method of claim 2, wherein rendering and re-rendering the collection of text comprises rendering and re-rendering a textual representation of one or more words included within the received voice-activated command.

8. A user interface system for raising the visibility of voice-activated command and control, the user interface system comprising:

a visible representation of a voice-activated command, wherein the visible representation of the voice-activated command includes text indicative of words recognized from within the voice-activated command;

a visible representation of action to be taken in response to the voice-activated command;

a visible association that relates said visible representation of the voice-activated command to the visible representation of action to be taken, wherein the visible association comprises a visual animation of the visible representation of the voice-activated command that moves across a display to a location that is overlapping with, or visually adjacent to, said visual representation of the action to be taken in response to the voice-activated command; and a computer processor that is a functional component of a computing device, wherein the computer processor renders, simultaneously on the output, the visible representation of the voice-activated command, said visible representation of action to be taken, and the visible association.

9. The user interface system of claim 8, wherein said visible representation of the voice-activated command comprises a textual representation of one or more words included within the voice-activated command.

10. The user interface system of claim 8, wherein providing a visible association comprises modifying display properties one or the other of, or both of, the visible representation of a voice-activated command and the visible representation of action to be taken.

11. A computer-implemented method for raising the visibility of a voice-activated user interface, the method comprising:

receiving a voice-activated command;

utilizing a computer processor that is a component of the computer to generate a textual representation of one or more words associated with the voice-activated command;

displaying the visual representation of the received voice-activated command on a display; and providing, on the display, a visual animation of the textual representation such that the textual representation moves across the display to a location that is overlapping with, or visually adjacent to, a visible representation of action to be taken in response to the received voice-activated command.

12. The method of claim 11, wherein the visual animation is such that the textual representation moves toward the visible representation of action to be taken in an indirect route.

13. The method of claim 11, wherein the visual animation is such that the textual representation changes size as it moves toward the visible representation of action to be taken.

14. The method of claim 11, wherein the visual animation is such that the textual representation is rendered in an animated fashion wherein the textual representation is rendered and re-rendered repeatedly so as to simulate movement across the display.

* * * * *